United States Patent
Jeon

(10) Patent No.: US 9,041,592 B2
(45) Date of Patent: May 26, 2015

(54) RADAR SENSOR AND METHOD OF DETECTING OBJECT USING THE SAME

(71) Applicant: SAMSUNG TECHWIN CO., LTD., Changwon (KR)

(72) Inventor: Ki-Yong Jeon, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 250 days.

(21) Appl. No.: 13/650,893

(22) Filed: Oct. 12, 2012

(65) Prior Publication Data

US 2013/0093616 A1    Apr. 18, 2013

(30) Foreign Application Priority Data

Oct. 14, 2011    (KR) .................. 10-2011-0105537

(51) Int. Cl.
| | |
|---|---|
| G01S 13/04 | (2006.01) |
| G01S 7/41 | (2006.01) |
| G01S 13/56 | (2006.01) |
| G01S 13/58 | (2006.01) |
| G01S 13/66 | (2006.01) |
| G01S 13/00 | (2006.01) |
| G01S 7/00 | (2006.01) |
| G01S 13/88 | (2006.01) |

(52) U.S. Cl.
CPC ................. *G01S 7/412* (2013.01); *G01S 7/414* (2013.01); *G01S 7/415* (2013.01); *G01S 13/003* (2013.01); *G01S 13/56* (2013.01); *G01S 13/582* (2013.01); *G01S 13/66* (2013.01); *G01S 13/886* (2013.01)

(58) Field of Classification Search
CPC ........... G01S 7/41; G01S 7/411; G01S 7/412; G01S 7/414; G01S 7/415; G01S 13/003; G01S 13/02; G01S 13/50; G01S 13/52; G01S 13/56; G01S 13/58; G01S 13/581; G01S 13/582; G01S 13/66; G01S 13/88; G01S 13/886
USPC ............... 342/22, 27, 28, 70–72, 89–91, 175, 342/192–197, 25 R–25 F, 59, 104–110, 118
See application file for complete search history.

(56) References Cited

U.S. PATENT DOCUMENTS

| | | | | |
|---|---|---|---|---|
| 3,903,520 | A | * | 9/1975 | Shostak .......................... 342/22 |
| 3,974,328 | A | * | 8/1976 | Thomas et al. ................. 342/27 |
| 4,075,630 | A | * | 2/1978 | Shapiro et al. ................ 342/196 |
| 4,348,674 | A | * | 9/1982 | Muth et al. .................... 342/192 |
| 4,389,648 | A | * | 6/1983 | Luscombe et al. .......... 342/25 D |
| 4,598,293 | A | * | 7/1986 | Wong .............................. 342/27 |
| 4,847,622 | A | * | 7/1989 | Maitre et al. ................. 342/110 |
| 4,992,797 | A | * | 2/1991 | Gjessing et al. ............. 342/192 |

(Continued)

FOREIGN PATENT DOCUMENTS

| | | |
|---|---|---|
| JP | 2008-186416 A | 8/2008 |
| JP | 2009-31188 A | 2/2009 |
| JP | 2011-27457 A | 2/2011 |

*Primary Examiner* — Bernarr Gregory
(74) *Attorney, Agent, or Firm* — Sughrue Mion, PLLC

(57) ABSTRACT

A radar sensor and a method of detecting an object by using the same are provided. The method includes: receiving at least one radar signal reflected from the object; converting the received at least one radar signal to at least one signal in a frequency domain; accumulating the converted at least one signal for a predetermined time and extracting at least one feature from the accumulated at least one signal; and identifying the object by comparing the extracted at least one feature with at least one reference value stored in a database.

10 Claims, 8 Drawing Sheets

(56) References Cited

U.S. PATENT DOCUMENTS

| | | | |
|---|---|---|---|
| 5,070,335 A * | 12/1991 | Lewis et al. | 342/90 |
| 5,337,053 A * | 8/1994 | Dwyer | 342/90 |
| 5,339,082 A * | 8/1994 | Norsworthy | 342/90 |
| 5,341,141 A * | 8/1994 | Frazier et al. | 342/59 |
| 5,446,461 A * | 8/1995 | Frazier | 342/22 |
| 5,504,487 A * | 4/1996 | Tucker | 342/90 |
| 5,594,451 A * | 1/1997 | Krikorian et al. | 342/196 |
| 5,612,700 A * | 3/1997 | Tucker | 342/90 |
| 5,757,309 A * | 5/1998 | Brooks et al. | 342/90 |
| 5,867,118 A * | 2/1999 | McCoy et al. | 342/90 |
| 6,215,439 B1 * | 4/2001 | Geldart et al. | 342/192 |
| 6,337,654 B1 * | 1/2002 | Richardson et al. | 342/90 |
| 6,437,728 B1 * | 8/2002 | Richardson et al. | 342/90 |
| 6,529,157 B1 * | 3/2003 | Mensa et al. | 342/195 |
| 6,657,582 B2 * | 12/2003 | Seki et al. | 342/70 |
| 6,664,920 B1 * | 12/2003 | Mott et al. | 342/70 |
| 6,943,724 B1 * | 9/2005 | Brace et al. | 342/25 B |
| 7,002,509 B2 * | 2/2006 | Karlsson | 342/90 |
| 7,053,817 B2 * | 5/2006 | Nakano et al. | 342/90 |
| 7,460,058 B2 * | 12/2008 | Nakanishi | 342/175 |
| 7,821,870 B2 * | 10/2010 | Ramakrishnan | 342/175 |

* cited by examiner

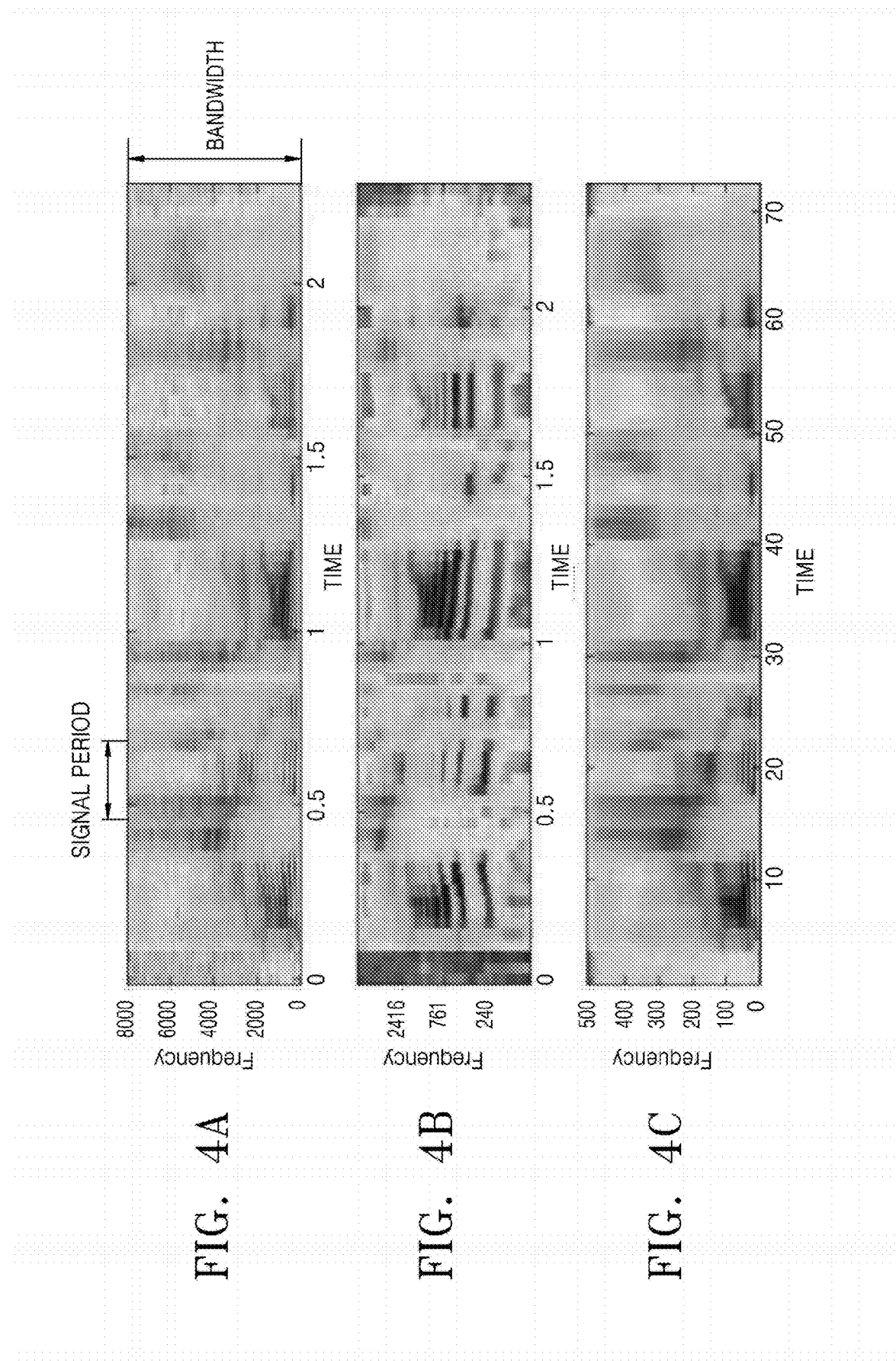

FIG. 5A

| TYPE | FREQUENCY SPECTROGRAM |
|---|---|
| HUMAN BEING | PATTERN A |
| ANIMAL | PATTERN B |
| OBJECT 1 | PATTERN C |
| ⋮ | ⋮ |

FIG. 5B

| ENVIRONMENT | BACKGROUND FEATURE VECTOR | Min/Max |
|---|---|---|
| A | X X | X X/XX |
| B | X X | X X/XX |
| ⋮ | ⋮ | ⋮ |

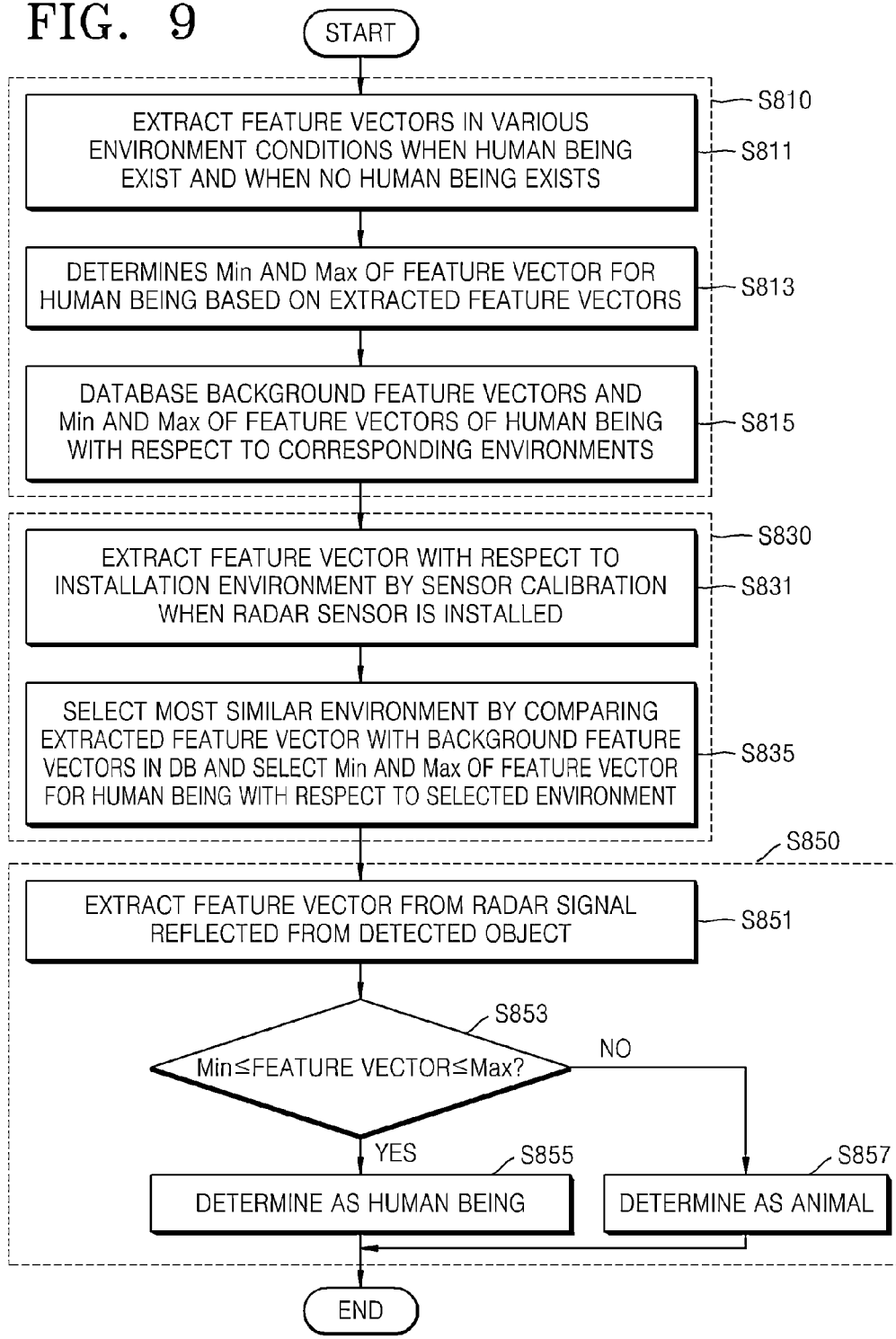

RADAR SENSOR AND METHOD OF DETECTING OBJECT USING THE SAME

CROSS-REFERENCE TO RELATED PATENT APPLICATION

This application claims priority from Korean Patent Application No. 10-2011-0105537, filed on Oct. 14, 2011, in the Korean Intellectual Property Office, the disclosure of which is incorporated herein in its entirety by reference.

BACKGROUND

1. Field

Apparatuses and methods consistent with exemplary embodiments relate to a radar sensor and detecting an object using the radar sensor.

2. Description of the Related Art

Related art methods of detecting an object by analyzing image data have a disadvantage in terms of low object detection accuracy due to a natural phenomenon, such as wind causing trees to sway, or movement of a camera or closed-circuit television (CCTV) for monitoring an outdoor environment.

Methods of detecting an object using a passive infrared (PIR) sensor or a dual sensor have a disadvantage in that a frequent malfunction occurs due to an environment around the sensor.

Methods of detecting an object using a radar sensor have a disadvantage in that it is impossible to concretely identify a type of an object even though spatial information such as a location of the object may be acquired.

SUMMARY

One or more exemplary embodiments provide a radar sensor for correctly detecting an object and identifying a type of the detected object and a method of detecting an object using the same.

According to an aspect of an exemplary embodiment, there is provided a method of detecting an object using a radar sensor, the method including: receiving at least one radar signal reflected from the object; converting the received at least one radar signal to at least one signal in a frequency domain; accumulating the converted at least one signal for a predetermined time and extracting at least one feature from the accumulated at least one signal; and identifying the object by comparing the extracted at least one feature with at least one reference value stored in a database.

The extracting the feature may include: generating a frequency spectrogram based on the accumulated at least one signal; and extracting the at least one feature vector from the frequency spectrogram.

The at least one feature vector may include at least one of a signal periodicity, a frequency bandwidth, and an energy intensity.

The at least one reference value stored in the database may include a minimum value and a maximum value of each of at least one feature vector for a target object or a minimum value and a maximum value of a combination of the at least one feature vector for the target object, and the identifying of the object may include identifying whether the object is the target object on the basis of whether the extracted at least one feature vector is included between the minimum value and the maximum value of each of the at least one feature vector for the target object or the minimum value and the maximum value of the combination of the at least one feature vector for the target object.

The minimum value and the maximum value of each of the at least one feature vector for the target object, and the minimum value and the maximum value of the combination of the at least one feature vector for the target object.

The at least one reference value stored in the database may include at least one reference pattern generated on the basis of at least one feature vector determined for a target object, and the identifying the object may include identifying the object by comparing the extracted at least one feature vector with the at least one reference pattern stored in the database.

The method may further include: estimating a distance to the object based on the at least one radar signal; and detecting a motion of the object from a distance change of the object over time.

The method may further include determining a minimum value and a maximum value of each of at least one feature vector for a target object or a minimum value and a maximum value of a combination of the at least one feature vector for the target object based on a displacement between each of at least one feature vector of a radar signal reflected from a background when the target object does not exist in the background and at least one feature vector of a radar signal reflected from the target object when the target object exists in the background.

The identifying the object may include determining the object as the target object when the extracted at least one feature vector of the object is included between the minimum value and the maximum value of each of the at least one feature vector for the target object or the minimum value and the maximum value of the combination of the at least one feature vector for the target object.

The method may further include: determining a minimum value and a maximum value of at least one feature vector for a target object or a minimum value and a maximum value of a combination of the at least one feature vector for the target object based on a displacement between each of at least one background feature vector of a radar signal reflected from a background when the target object does not exist in the background and at least one feature vector of a radar signal reflected from the target object when the target object exists in the background, in different environment conditions; storing in the database each of the at least one background feature vector and the minimum value and the maximum value of the at least one feature vector for the target object or the minimum value and the maximum value of the combination of the at least one feature vector for the target object in the different environment conditions; selecting the most similar environment condition by comparing at least one feature vector of a radar signal reflected from a background of a monitoring area with the stored at least one background feature vector when the radar sensor is installed; and selecting a minimum value and a maximum value of at least one feature vector for the target object corresponding to the selected environment condition or a minimum value and a maximum value of a combination of the at least one feature vector for the target object corresponding to the selected environment condition.

According to an aspect of another exemplary embodiment, there is provided a radar sensor including: a signal converter which converts at least one radar signal reflected from an object to at least one signal in a frequency domain; a feature extractor which accumulates the converted at least one signal in the frequency domain for a predetermined time and extracts at least one feature of the object from the accumulated at least one signal; a database which stores at least one reference value for identifying the object; and a determiner which identifies the object by comparing the extracted at least one feature with the at least one reference value stored in the database.

The feature extractor may generate a frequency spectrogram based on the accumulated at least one signal and extracts the at least one feature vector from the frequency spectrogram.

The at least one feature vector may include at least one of a signal periodicity, a frequency bandwidth, and an energy intensity.

The at least one reference value stored in the database may include a minimum value and a maximum value of each of at least one feature vector for a target object or a minimum value and a maximum value of a combination of the at least one feature vector for the target object, and the determiner may identify whether the object is the target object on the basis of whether the extracted at least one feature vector is included between the minimum value and the maximum value of each of the at least one feature vector for the target object or the minimum value and the maximum value of the combination of the at least one feature vector for the target object.

The minimum value and the maximum value of each of the at least one feature vector for the target object, and the minimum value and the maximum value of the combination of the at least one feature vector for the target object may be adjusted according to an environment condition.

The at least one reference value stored in the database may include at least one reference pattern generated on the basis of at least one feature vector determined for a target object, and wherein the determiner may identify the object by comparing the extracted at least one feature vector with the at least one reference pattern stored in the database.

The feature extractor may extract at least one background feature vector of a radar signal reflected from a background when a target object does not exist in the background and at least one feature vector of a radar signal reflected from the target object when the target object exists in the background, in different environment conditions, and the database may store each of the at least one background feature vector and a minimum value and a maximum value of the at least one feature vector for the target object or a minimum value and a maximum value of a combination of the at least one feature vector for the target object which are determined based on a displacement between each of the at least one background feature vector of the radar signal reflected from the background when the target object does not exist in the background and the at least one feature vector of the radar signal reflected from the background when the target object exists in the background, in the different environment conditions.

The radar sensor may further include: a distance estimator which estimates a distance to the object based on the at least one radar signal; and a motion detector which detects a motion of the object from a distance change of the object over time.

BRIEF DESCRIPTION OF THE DRAWINGS

The above and other aspects will become more apparent by describing in detail exemplary embodiments with reference to the attached drawings, in which:

FIGS. 4A-4C illustrate frequency spectrograms having different patterns according to an exemplary embodiment;

FIGS. 5A and 5B show examples of a database according to an exemplary embodiment;

FIG. 9 is a flowchart illustrating a method of discriminating a human being from an animal, according to an exemplary embodiment.

DETAILED DESCRIPTION OF THE EXEMPLARY EMBODIMENT

The present invention will now be described more fully with reference to the accompanying drawings, in which exemplary embodiments of the invention are shown. In the following description, well-known functions or constructions are not described in detail since they would obscure the invention with unnecessary detail.

Although terms, such as 'first' and 'second', can be used to describe various elements, the elements are not limited by the terms. The terms may be used to classify a certain element from another element. For example, a first element may be named a second element without changing the scope, and likewise the second element may be named the first element. In addition, a series of operations in the present invention include not only sequential operations but also parallel or individual operations.

As used herein, expressions such as "at least one of," when preceding a list of elements, modify the entire list of elements and do not modify the individual elements of the list.

Figure 1:
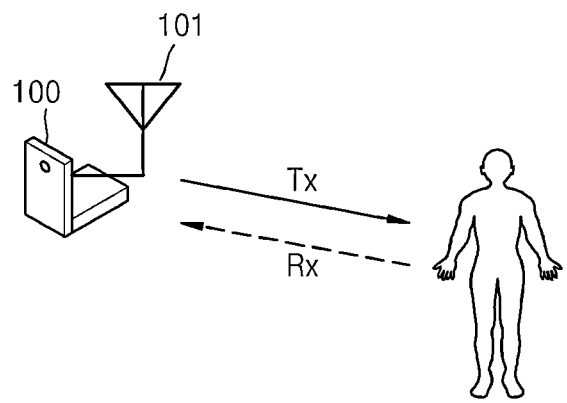
FIGS. 1 and 2 are conceptual diagrams for describing a method of detecting an object using a radar sensor, according to an exemplary embodiment.
Figure 2:
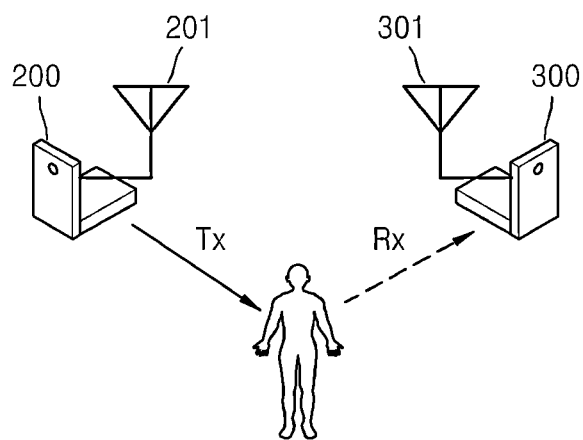

FIGS. 1 and 2 are conceptual diagrams for describing a method of detecting an object using a radar sensor, according to an exemplary embodiment. A radar sensor 100 of FIG. 1 is a transceiver-type radar sensor, and a radar sensor of FIG. 2 is a transmitter-and-receiver-type radar sensor.

Referring to FIG. 1, the radar sensor 100 outputs a radar signal Tx and receives a signal Rx reflected from an object through an antenna 101. The output radar signal Tx travels to the object in a straight line and returns by being reflected from the object. The radar sensor 100 may detect location information including a distance from the radar sensor 100 to the object (hereinafter, referred to as an object distance) and a phase by analyzing the output radar signal Tx and the received radar signal Rx reflected from the object. The radar sensor 100 may trace the object based on a change in the location information.

In addition, the radar sensor 100 may identify a type of the object by comparing features of the object, which are detected from the reflected radar signal Rx, with reference values stored in a database.

The antenna 101 may be embodied with a single antenna for transmission and reception or a set of individual antennas for transmission and reception.

Referring to FIG. 2, the transmitter-and-receiver-type radar sensor includes a radar transmitter 200 and a radar receiver 300.

The radar transmitter 200 and the radar receiver 300 are separated from each other and arranged in a monitoring area. The transmitter-and-receiver-type radar sensor of FIG. 2 has an advantage in that an object search distance can be extended than the transceiver-type radar sensor 100 of FIG. 1.

The radar transmitter 200 outputs a radar signal Tx through an antenna 201.

The radar receiver 300 receives the radar signal Tx output from the radar transmitter 200 and a signal Rx reflected from an object through an antenna 301. The radar receiver 300 may identify a type of the object by comparing features of the object, which are detected from the reflected radar signal Rx, with the reference values stored in the database.

Figure 3:
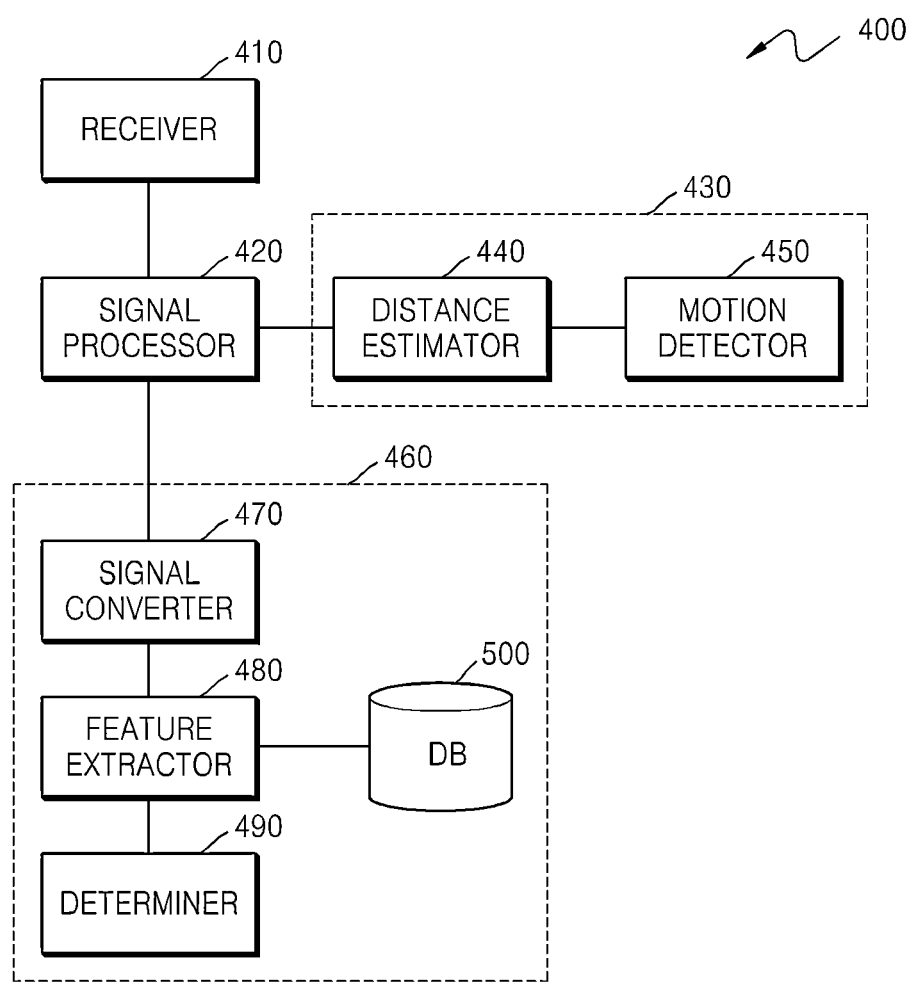
FIG. 3 is a block diagram of a radar sensor according to an exemplary embodiment.

FIG. 3 is a block diagram of a radar sensor 400 according to an exemplary embodiment.

Referring to FIG. 3, the radar sensor 400 includes a receiver 410, a signal processor 420, an object tracer 430, and an object identifier 460.

The radar sensor 400 may be a sensor for determining presence and absence of an object or an object distance, or a sensor for also detecting a location of an object. The radar sensor 400 of FIG. 3 may be embodied in a transceiver-type radar sensor of FIG. 1 or a transmitter-and-receiver-type radar sensor of FIG. 2.

The receiver 410 receives a radar signal (e.g., a radio frequency (RF) signal) reflected from an object through an antenna. The received radar signal is an impulse signal or a Doppler signal, and is a signal in a time domain.

The signal processor 420 removes clutter and noise from the radar signal. The signal processor 420 also samples radar signals in digital signal. For example, the signal processor 420 may process the sampled radar signals in every 150 to 200 ms interval. The signal processor 420 removes clutter and noise from the sampled radar signal. For example, the signal processor 420 may remove the clutter and noise using a loop-filter algorithm, a singular value decomposition (SVD) algorithm, etc. However, the inventive concept is not limited thereto, and various other methods may be used.

The object identifier 460 includes a signal converter 470, a feature extractor 480, a determiner 490, and a database 500.

The signal converter 470 converts the radar signal to a signal in the frequency domain. The signal converter 470 may convert a signal in the time domain to a signal in the frequency domain using, for example, fast Fourier transformation (FFT).

The feature extractor 480 accumulates the converted signals in the frequency domain for a predetermined time, and extracts at least one feature vector from the accumulated signals. The feature extractor 480 generates a frequency spectrogram based on signals in the frequency domain, which are accumulated for a predetermined time, and extracts the at least one feature vector from the frequency spectrogram. A feature vector maybe a signal periodicity, a frequency bandwidth, or an energy intensity, but not being limited thereto.

A pattern of a reflected and received RF signal may vary according to a motion of a human being, a motion of an animal, or a response signal of a moving object such as a vehicle. The motion of a human being has a common pattern in general, and this pattern is different from a moving pattern of an animal or a response signal pattern of an object. For example, a radar reception signal of a walking motion of a human being shows a regular period pattern. A radar reception signal of a motion of an animal shows an irregular period pattern unlike a human being. This is because an animal does not move at a constant speed or in a regular pattern, unlike a human being. A radar reception signal of a fixed object is a regular signal, such as noise, with a relatively large amplitude. A radar reception signal of a moving object shows a signal feature that is different from the other radar reception signals. Thus, the determiner 490 may identify the object by additionally analyzing a radar reception signal.

FIGS. 4A-4C illustrate frequency spectrograms having different patterns, according to exemplary embodiments. Referring to FIGS. 4A-4C, in each of the frequency spectrograms, an x-axis indicates a time, and a y-axis indicates a frequency. An interval in which a signal repeats along the x-axis indicates a signal periodicity. A signal range along the y-axis indicates a frequency bandwidth. A contrast indicates energy intensity (or energy amount). As shown in FIGS. 4A-4C, each object has a different frequency spectrogram.

The determiner 490 may identify the object by comparing the extracted feature vector with reference values stored in the database 500. The determiner 490 may classify the object into, for example, a human being, an animal, a moving object (e.g., a robot or vehicle), etc. by using pattern comparison.

FIG. 5A shows an example of the database 500 according to an exemplary embodiment.

The database 500 stores reference patterns based on feature vectors extracted from frequency spectrograms regarding a human being, animals (a cat, a dog, etc.), and fixed and moving objects (trees, vehicles, etc.) in advance.

Referring to FIG. 5A, the database 500 defines reference patterns (a pattern A, a pattern B, a pattern C, . . . ) based on feature vectors extracted from frequency spectrograms of objects and stores the reference patterns with the corresponding types of the objects. For example, when at least one feature vector extracted from a radar signal reflected from an object matches with the reference pattern A of the database 500, the determiner 490 may identify the object as a human being. In this way, the determiner 490 may classify the object into, for example, a human being, an animal, a moving object (e.g., a robot or vehicle), etc. by using pattern comparison. Here, the pattern stored in the database 500 may be at least one of a signal periodicity, a frequency bandwidth, an energy intensity, etc. According to another exemplary embodiment, the pattern may be a combination value of at least two of a signal periodicity, a frequency bandwidth, an energy intensity, etc. In this case, the feature extractor 480 may generate a combination value of at least one feature vector extracted from the frequency spectrograms to compare the combination value with the pattern stored in the database 500.

Although the identification is only performed to distinguish human beings from the other objects in the current exemplary embodiment for convenience of description, the database 500 may classify the human beings into different categories such as ages and appearances.

FIG. 5B shows another example of the database 500 according to an exemplary embodiment.

When the database 500 stores reference patterns based on objects, a data amount may be large. Thus, the database 500 may specify an object to be identified and have only a feature vector threshold range of the specified object (hereinafter, referred to as 'target object') to easily identify the target object. For example, when the target object is a human being, the database 500 may store only a minimum value Min and a maximum value Max of a feature vector for a human being. In this case, since the feature vector may vary according to environment conditions, the minimum value Min and the maximum value Max may be adjusted according to environment conditions. According to another exemplary embodiment, the minimum value Min and the maximum value Max may be a minimum value of a combination value of at least two feature vectors and a maximum value of a combination value of the at least two feature vectors.

A method of determining a minimum value Min and a maximum value Max of a feature vector for a human being will now be described. First, a feature vector (hereinafter, referred to as 'background feature vector') is extracted when no human being exists in various environment conditions (e.g., low and high luminance environments, corridors, stairways, outdoors, etc.). This is to check whether a signal period cause exists due to periodic shaking of surrounding objects when no human being exists. Next, a feature vector is extracted when a human being exists in the same environment when the background feature vector is extracted. A minimum value Min and a maximum value Max of a feature vector for a human being are determined in each environment based on a displacement A of the feature vector extracted when a human being exists in comparison to the background feature vector.

Referring to FIG. 5B, the database 500 stores, as reference values, background feature vectors extracted from backgrounds, in each environment condition, and a minimum value Min and a maximum value Max of a feature vector for a human being, in each environment condition. For example, when a feature vector extracted from a radar signal reflected from an object is comprised between the minimum value Min and the maximum value Max of the feature vector for a human being of the database 500, the determiner 490 may identify the object as a human being.

In initial installation of the radar sensor 400, the radar sensor 400 selects the most similar environment by comparing a plurality of stored background feature vectors with a background feature vector of an installation environment and sets in advance a minimum value Min and a maximum value Max of a feature vector for a human being that correspond to the selected environment. Thus, the determiner 490 may determine whether an object is a human being, on the basis of whether an extracted feature vector is between the pre-set minimum and maximum values Min and Max of the feature vector for a human being. As such, the radar sensor 400 may easily and correctly identify an object by adjusting feature vector minimum and maximum values by taking an environment condition into account.

Although the current exemplary embodiment illustrates a method of determining a threshold range of a feature vector for a human being for convenience of description, the inventive concept is not limited thereto, and may also be applied to identification of an animal in the same way by extracting a feature vector of a specific animal, such as cat or dog, and determining a minimum value and a maximum value of the feature vector.

The radar sensor 400 may trace an object by using a radar signal separately from or before the operation of identifying a type of an object. Thus, the object tracer 430 and the object identifier 460 may operate in parallel and perform object detection and tracing, and object detection and identification, respectively.

The object tracer 430 includes a distance estimator 440 and a motion detector 450.

The distance estimator 440 may estimate the object distance based on the impulse radar signal. The distance estimator 440 may estimate the object distance based on a similarity between an output radar signal and a radar signal reflected from an object. The distance estimator 440 may measure a time difference between the output radar signal and the reflected radar signal by using a cross-correlation function and estimate the object distance based on the measured time difference.

The motion detector 450 may detect a motion of the object based on the estimated distance information. The motion detector 450 may compensate the estimated distance by using a Kalman-filter algorithm.

Figure 6A:
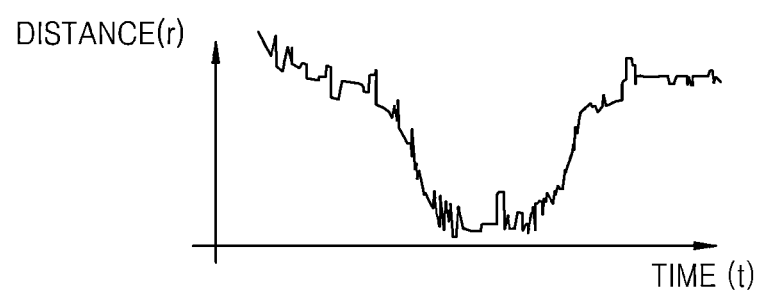
FIGS. 6A and 6B are graphs for describing motion tracking of an object according to an exemplary embodiment.
Figure 6B:
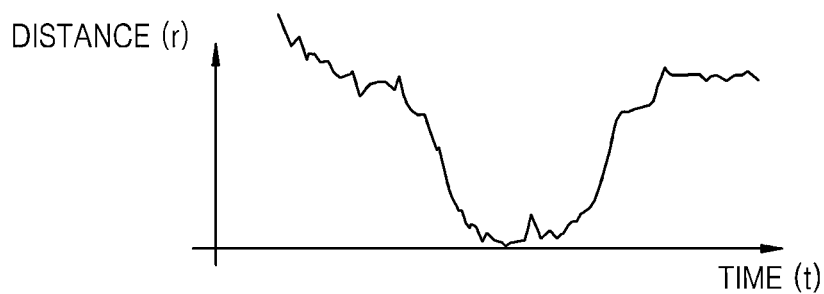

FIGS. 6A and 6B are graphs for describing motion tracking of an object according to an exemplary embodiment. Referring to FIG. 6A, the motion detector 450 may detect a motion of an object based on a change in an object distance over time. Referring to FIG. 6B, the motion detector 450 may correct the estimated object distance by applying motion characteristics so that the motion of the object is natural. For example, the motion detector 450 may correct the graph of FIG. 6A to a smooth graph of FIG. 6B using the Kalman-filter algorithm.

Figure 7:
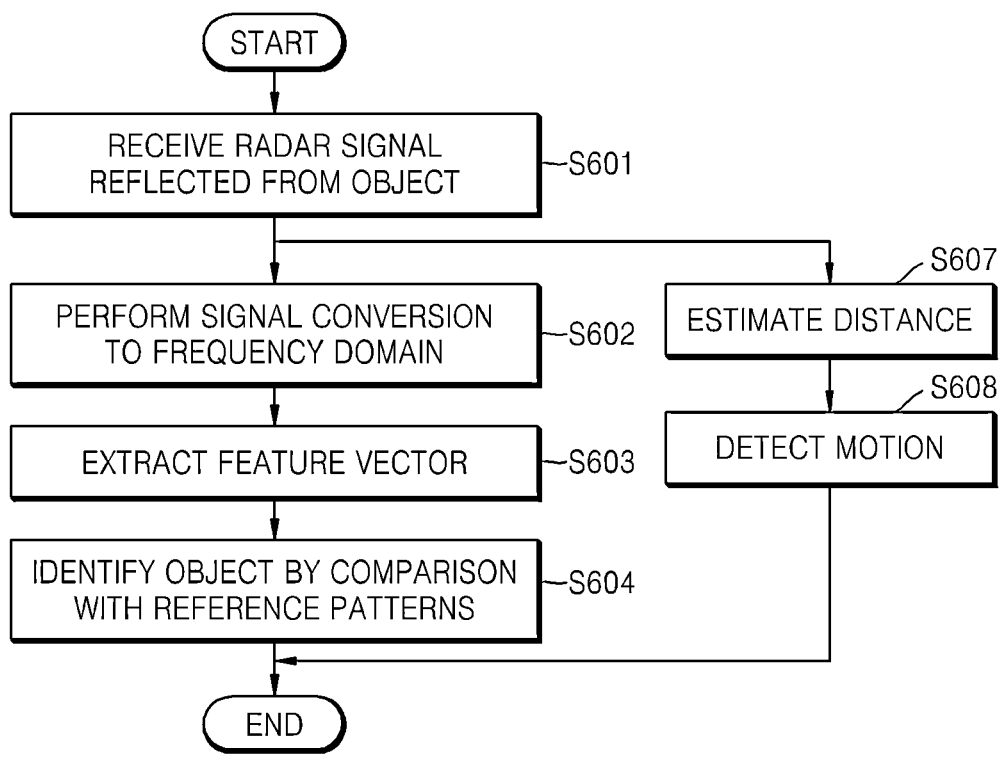
FIG. 7 is a flowchart illustrating the method of detecting an object using a radar sensor, according to an exemplary embodiment.

FIG. 7 is a flowchart illustrating a method of detecting an object using a radar sensor, according to an exemplary embodiment.

Referring to FIG. 7, in operation S601, the radar sensor receives a radar signal reflected from the object. The received radar signal is an impulse signal or a Doppler signal in a time domain. Additionally, the radar sensor may remove clutter and noise from the radar signal. To do this, the radar sensor may use the loop-filter algorithm, the SVD algorithm, etc.

In operation S602, the radar sensor converts the radar signal to a signal in the frequency domain. The radar sensor may convert the radar signal in the time domain to the signal in the frequency domain using FFT.

In operation S603, the radar sensor accumulates converted signals in the frequency domain for a predetermined time and extracts at least one feature vector from the accumulated signals. A feature vector may be a signal periodicity, a frequency bandwidth, or an energy intensity, not being limited thereto. The radar sensor may define the detection pattern by generating a frequency spectrogram based on the accumulated signals and extracting the at least one feature vector from the frequency spectrogram.

In operation S604, the radar sensor identifies a type of the object by comparing the at least one feature vector with reference patterns stored in a database. The radar sensor may determine the type of the object by finding a reference pattern matching with the at least one feature vector from among the reference patterns stored in a database.

The radar sensor may trace the object using impulse radar signals, rather than performing the operation of identifying a type of an object.

In operation S607, the radar sensor estimates an object distance based on the impulse radar signal. The radar sensor may estimate an object distance based on similarity between an output radar signal and a radar signal reflected from an object. The radar sensor may measure a time difference between the output radar signal and the reflected radar signal using a cross-correlation function, and estimate the object distance based on the measured time difference.

In operation S608, the radar sensor detects a motion of the object based on a change in the object distance over time. The radar sensor may correct the estimated object distance using the Kalman-filter algorithm.

Figure 8:
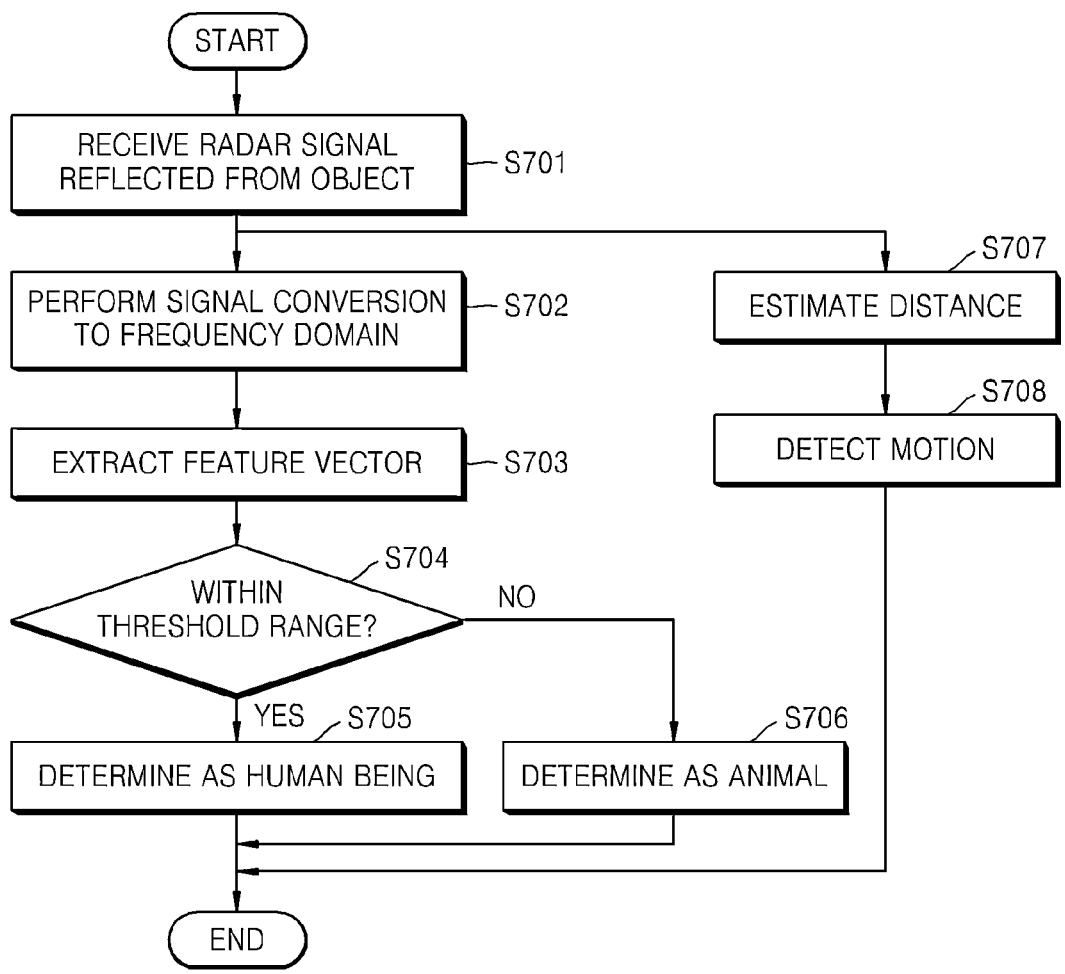
FIG. 8 is a flowchart illustrating the method of detecting an object using a radar sensor, according to another exemplary embodiment.

FIG. 8 is a flowchart illustrating a method of detecting an object using a radar sensor, according to another exemplary embodiment.

Referring to FIG. 8, in operation S701, the radar sensor receives a radar signal reflected from the object. The received radar signal is an impulse signal or a Doppler signal in a time domain. Additionally, the radar sensor may remove clutter and noise from the radar signal. To do this, the radar sensor may use the loop-filter algorithm, the SVD algorithm, etc.

In operation S702, the radar sensor converts the radar signal to a signal in the frequency domain. The radar sensor may convert the radar signal in the time domain to the signal in the frequency domain using FFT.

In operation S703, the radar sensor accumulates converted signals in the frequency domain for a predetermined time and extracts at least one feature vector from the accumulated signals. The radar sensor may define the detection pattern by generating a frequency spectrogram based on the accumulated signals and extracting the at least one feature vector from the frequency spectrogram. A feature vector may be a signal periodicity, a frequency bandwidth, or an energy intensity, not being limited thereto. For example, the radar sensor may extract the signal periodicity, the frequency bandwidth, and the energy intensity, respectively, as a first feature vector, a second feature vector and a third feature vector.

In operation S704, the radar sensor determines whether the extracted feature vector is included in a range of threshold values of a feature vector with respect to a human being, which is stored in a database. The range of threshold values is defined based on a minimum value Min and a maximum value Max. For example, the radar sensor determines whether the extracted first, second and third feature vectors are included between respective minimum values Min and maximum values Max or respective ranges of threshold values of reference first, second and third feature vectors for a human being.

Next, in operation S704, if each of the extracted feature vectors is included in the respective range of the threshold value of the reference feature vector, the radar sensor may determine the object is a human being. Otherwise, the radar sensor determines in operation S706 that the object is an animal. According to another exemplary embodiment, the radar sensor may determine that the object is a human being, if at least one of the first to third feature vectors is included in the respective range of the threshold value of the reference feature vector for a human being. According to still another exemplary embodiment, the radar sensor may determine that the object is a human being, if a combination value of at least two of the feature vectors is within a range of a combination value of the reference feature vectors.

The radar sensor may trace the object using impulse radar signals, rather than performing the operation of identifying a type of an object.

In operation S707, the radar sensor estimates an object distance based on the impulse radar signal. The radar sensor may estimate an object distance based on similarity between an output radar signal and a radar signal reflected from an object. The radar sensor may measure a time difference between the output radar signal and the reflected radar signal using a cross-correlation function and estimate the object distance based on the measured time difference.

In operation S708, the radar sensor detects a motion of the object based on a change in the object distance over time. The radar sensor may correct the estimated object distance using the Kalman-filter algorithm.

FIG. 9 is a flowchart illustrating a method of discriminating a human being from an animal, according to an exemplary embodiment.

Referring to FIG. 9, a method of identifying a human being by using a radar sensor may include establishing a database (operation S810), setting a reference value (operation S830), and identifying a human being (operation S850).

Establishing the database (operation S810) includes securing reference values with respect to various environments.

In operation S811, the radar sensor extracts at least one reference feature vector in various environment conditions when a human being exists and when no human being exists. A feature vector may be a signal periodicity, a frequency bandwidth, or an energy intensity, etc. For example, the radar sensor may extract the signal periodicity, the frequency bandwidth, and the energy intensity, respectively, as a first feature vector, a second feature vector and a third feature vector when no human being exists, as well as when a human being exists.

In operation S813, the radar sensor determines a minimum value Min and a maximum value Max of a feature vector for a human being based on a displacement $\Delta$ of a feature vector extracted when a human being exists in comparison to a background feature vector extracted when no human being exists, in each environment. For example, a minimum value and a maximum value of each of the first, second and third feature vectors for a human being is set based on a displacement of each of the first, second and third feature vectors when a human being exists in comparison to each of the first, second and third feature vectors extracted when no human being exists, respectively, in each environment.

In operation S815, the radar sensor stores in a database the background feature vectors and the minimum values Min and the maximum values Max of the feature vectors of a human being with respect to the corresponding environments. For example, the radar sensor may store the first to third background feature vectors and minimum values Min and the maximum values Max of the first to third feature vectors of a human being with respect to each environment in the database.

Setting a reference value (operation S830) includes setting a reference value according to an environment in which the radar sensor is installed.

In operation S831, when the radar sensor enters into a sensor calibration state in an initial installation, the radar sensor extracts a feature vector with respect to the installation environment. For example, the radar sensor may extract the first to third feature vectors of a background with respect to the installation environment.

In operation S835, the radar sensor selects an environment most similar to the installation environment of the radar sensor by comparing the extracted at least one feature vector with the background feature vectors in the database and simultaneously selects a minimum value Min and a maximum value Max of at least one feature vector for a human being that are associated with the selected environment from the database as reference values. For example, the radar sensor may select the most similar environment from a result of comparing at least one of the first to third feature vectors with respect to the installation environment with at least one of the first to third feature vectors with respect to each environment in the database. In addition, the radar sensor may select maximum values Min and minimum values Max of the first to third feature vectors with respect to the selected environment as the reference values.

Identifying a human being (operation S850) includes determining whether a detected object is a human being. In operation S851, the radar sensor extracts at least one feature vector from a radar signal reflected from the object. The object detection method shown in FIG. 8 may be applied to the identifying a human being (operation S850).

In detail, the radar sensor may remove noise from the reflected radar signal, convert the radar signal in the time domain to a radar signal in the frequency domain, generate a frequency spectrogram of radar signal accumulated for a predetermined time, and extract at least one feature vector from the frequency spectrogram. Since a feature vector extracting process is described above, a detailed description thereof is omitted. In operation S853, the radar sensor determines whether the extracted at least one feature vector is included between the minimum value Min and the maximum value Max of the at least one feature vector for a human being that are selected in operation S835. For example, the radar sensor may determine whether the first to third feature vectors extracted from the radar signal reflected from the object are included between maximum values and minimum values of the first to third feature vectors that are reference values.

As a result of the determination, if the extracted at least one feature vector is included between the minimum value Min and the maximum value Max of the at least one feature vector for a human being that are selected in operation S835, the radar sensor determines in operation S855 that the object is a human being. Otherwise, the radar sensor determines in operation S857 that the object is an animal. According to an exemplary embodiment, the radar sensor may determine whether the object is a human being, on the basis of at least one of comparison results of the first to third feature vectors. According to another exemplary embodiment, the radar sensor may determine whether the object is a human being, on the basis of a comparison result of a combination value of at least two of the first to third feature vectors.

Although FIG. 9 illustrates a human being identification method, the inventive concept is not limited to the identification of a human being and may also be applied to the identification of an animal in the same way by extracting feature vectors of specific animals and establishing a database of minimum values and maximum values of the extracted feature vectors.

According to the above exemplary embodiments, an object may be detected and a type of the detected object may be identified by processing and analyzing an RF radar reception signal in the frequency domain. In addition, a determination criterion may be adjusted by taking a surrounding environment into account, thereby correctly determining a type of an object.

While the exemplary embodiments have been particularly shown and described with reference to the drawings thereof, it will be understood by those of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A method of detecting an object using a radar sensor, the method comprising:
   determining a minimum value and a maximum value of at least one feature vector for a target object or a minimum value and a maximum value of a combination of the at least one feature vector for the target object based on a displacement between each of at least one background feature vector of a radar signal reflected from a background when the target object does not exist in the back round and at least one feature vector of a radar signal reflected from the target object when the target object exists in the background, in different environment conditions;
   storing in a database each of the at least one background feature vector and the minimum value and the maximum value of the at least one feature vector for the target object or the minimum value and the maximum value of the combination of the at least one feature vector for the target object, in the different environment conditions;
   selecting the most similar environment condition by comparing at least one feature vector of a radar signal reflected from a background of a monitoring area with the stored at least one background feature vector when the radar sensor is installed; and
   selecting a minimum value and a maximum value of at least one feature vector for the target object corresponding to the selected environment condition or a minimum value and a maximum value of a combination of the at least one feature vector for the target object corresponding to the selected environment condition as a reference minimum value and a reference maximum value;
   receiving at least one radar signal reflected from the object in the monitoring area;
   converting the received at least one radar signal to at least one signal in a frequency domain;
   extracting at least one feature from the at least one signal in the frequency domain for a predetermined time; and
   identifying the object by comparing the extracted at least one feature with the reference minimum value and the reference maximum value selected from the database.

2. The method of claim 1, wherein the extracting the at least one feature comprises:
   generating a frequency spectrogram based on the at least one signal; and
   extracting the at least one feature vector from the frequency spectrogram.

3. The method of claim 2, wherein the at least one feature vector comprises at least one of a signal periodicity, a frequency bandwidth, and an energy intensity.

4. The method of claim 1, wherein the at least one feature vector comprises at least one of a signal periodicity, a frequency bandwidth, and an energy intensity.

5. The method of claim 1, further comprising:
   estimating a distance to the object based on the at least one radar signal; and
   detecting a motion of the object from a distance change of the object over time.

6. The method of claim 1, wherein the identifying the object comprises determining the object as the target object when the at least one extracted feature vector is included between the reference minimum value and the reference maximum value corresponding to the selected environment condition.

7. A radar sensor comprising:
   a signal converter which converts at least one radar signal reflected from an object to at least one signal in a frequency domain;
   a feature extractor which extracts at least one background feature vector of a radar signal reflected from a background when a target object does not exist in the background and at least one feature vector of a radar signal reflected from the target object when the target object exists in the background, in different environment conditions;
   a database which stores each of the at least one background feature vector and a minimum value and a maximum value of the at least one feature vector the target object or a minimum value and a maximum value of a combination of the at least one feature vector for the target object which are determined based on a displacement between each of the at least one background feature vector of the radar signal reflected from the background when the target object does not exist in the background and the at least one feature vector of the radar sign reflected from the background when the target object exists in the background, in the different environment conditions; and
   a determiner which selects the most similar environment condition by comparing at least one feature vector of a radar signal reflected from a background of a monitoring area with the stored at least one background feature vector when the radar sensor is installed, and selects a minimum value and a maximum value of at least one feature vector for the target object corresponding to the selected environment condition or a minimum value and a maximum value of a combination of the at least one feature vector for the target object corresponding to the selected environment condition as a reference minimum value and a reference maximum value, wherein the signal converter converts at least one radar signal reflected from an object in the monitoring area to at least one signal in a frequency domain, wherein the feature extractor extracts at least one feature of the object from the at least one signal in the frequency domain for a predetermined time, wherein the database stores reference minimum values and reference maximum values corresponding to the different environment conditions, and wherein the determiner identifies the object by comparing the extracted at least one feature with the reference minimum value and the reference maximum value.

8. The radar sensor of claim 7, wherein the feature extractor generates a frequency spectrogram based on the at least one signal and extracts the at least one feature vector from the frequency spectrogram.

9. The radar sensor of claim 7, wherein the at least one feature vector comprises at least one of a signal periodicity, a frequency bandwidth, and an energy intensity.

10. The radar sensor of claim 7, further comprising:
a distance estimator which estimates a distance to the object based on the at least one radar signal; and
a motion detector which detects a motion of the object from a distance change of the object over time.

* * * * *